United States Patent
Hadani et al.

(10) Patent No.: US 10,693,692 B2
(45) Date of Patent: Jun. 23, 2020

(54) RECEIVER-SIDE PROCESSING OF ORTHOGONAL TIME FREQUENCY SPACE MODULATED SIGNALS

(71) Applicant: Cohere Technologies, Santa Clara, CA (US)

(72) Inventors: Ronny Hadani, Santa Clara, CA (US); Shlomo Selim Rakib, Santa Clara, CA (US); Anthony Ekpenyong, Santa Clara, CA (US); Clayton Ambrose, Santa Clara, CA (US); Shachar Kons, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/084,791

(22) PCT Filed: Mar. 23, 2017

(86) PCT No.: PCT/US2017/023892
§ 371 (c)(1),
(2) Date: Sep. 13, 2018

(87) PCT Pub. No.: WO2017/165697
PCT Pub. Date: Sep. 28, 2017

(65) Prior Publication Data
US 2019/0081836 A1      Mar. 14, 2019

Related U.S. Application Data

(60) Provisional application No. 62/312,367, filed on Mar. 23, 2016.

(51) Int. Cl.
*H04L 27/26*     (2006.01)
*H04L 5/00*      (2006.01)
(Continued)

(52) U.S. Cl.
CPC ............ *H04L 27/2613* (2013.01); *H04L 5/00* (2013.01); *H04L 5/0023* (2013.01);
(Continued)

(58) Field of Classification Search
CPC ... H04L 27/2613; H04L 27/2647; H04L 5/00; H04L 5/0023; H04L 5/0048;
(Continued)

(56) References Cited

U.S. PATENT DOCUMENTS

| | | |
|---|---|---|
| 4,754,493 A | 6/1988 | Coates |
| 5,083,135 A | 1/1992 | Nagy et al. |

(Continued)

FOREIGN PATENT DOCUMENTS

| | | |
|---|---|---|
| CN | 1235720 A | 11/1999 |
| CN | 101682316 A | 3/2010 |

(Continued)

OTHER PUBLICATIONS

International Search Report and Written Opinion for International Application No. PCT/US2017/025797, dated Jun. 21, 2017, 6 pages.

(Continued)

*Primary Examiner* — Eunsook Choi

(57) ABSTRACT

Wireless communication techniques for transmitting and receiving reference signals is described. The reference signals may include pilot signals that are transmitted using transmission resources that are separate from data transmission resources. Pilot signals are continuously transmitted from a base station to user equipment being served. Pilot signals are generated from delay-Doppler domain signals that are processed to obtain time-frequency signals that occupy a two-dimensional lattice in the time frequency domain that is non-overlapping with a lattice corresponding to data signal transmissions.

26 Claims, 12 Drawing Sheets

(51) Int. Cl.
*H04L 1/00* (2006.01)
*H04B 7/0413* (2017.01)

(52) U.S. Cl.
CPC .......... *H04L 5/0048* (2013.01); *H04L 27/265* (2013.01); *H04L 27/2634* (2013.01); *H04L 27/2639* (2013.01); *H04L 27/2647* (2013.01); *H04L 27/2697* (2013.01); *H04B 7/0413* (2013.01); *H04L 1/0045* (2013.01); *H04L 5/0007* (2013.01)

(58) Field of Classification Search
CPC ............... H04L 27/2634; H04L 27/265; H04L 27/2697; H04L 27/2639; H04L 1/0045; H04L 5/0007; H04B 7/0413
See application file for complete search history.

(56) References Cited

U.S. PATENT DOCUMENTS

| | | |
|---|---|---|
| 5,182,642 A | 1/1993 | Gersdorff et al. |
| 5,483,557 A * | 1/1996 | Webb ................. H04B 7/005 375/229 |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2005/0265490 A1 * | 12/2005 | Sestok, IV .......... H04L 25/0232 375/340 |
| 2006/0008021 A1 | 1/2006 | Bonnet |
| 2006/0039270 A1 | 2/2006 | Strohmer et al. |
| 2006/0182193 A1 | 8/2006 | Monsen |
| 2007/0014272 A1 | 1/2007 | Palanki et al. |
| 2007/0038691 A1 | 2/2007 | Candes et al. |
| 2007/0058739 A1 | 3/2007 | Aytur et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0130777 A1 * | 6/2008 | Landau ................ H04B 1/7105 375/267 |
| 2008/0186843 A1 | 8/2008 | Ma et al. |
| 2008/0187062 A1 | 8/2008 | Pan et al. |
| 2008/0212722 A1 | 9/2008 | Heikkila |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0142153 A1 | 6/2011 | Yoon et al. |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |

(56) References Cited

U.S. PATENT DOCUMENTS

| | | |
|---|---|---|
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1* | 6/2014 | Hadani ............... H04L 27/265 370/436 |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 1, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report and Written Opinion for PCT Application No. PCT/US2017/023892, dated Jun. 9, 2017, 20 pages.
Office Action for U.S. Appl. No. 13/117,119, dated Aug. 5, 2013, 5 pages.
Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.

(56) References Cited

OTHER PUBLICATIONS

Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 in: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

* cited by examiner

US 10,693,692 B2

RECEIVER-SIDE PROCESSING OF ORTHOGONAL TIME FREQUENCY SPACE MODULATED SIGNALS

CROSS-REFERENCE TO RELATED APPLICATIONS

This patent document is a 371 National Phase Application of PCT Application No. PCT/US2017/023892, entitled "RECEIVER-SIDE PROCESSING OF ORTHOGONAL TIME FREQUENCY SPACE MODULATED SIGNALS" filed on Mar. 23, 2017, which claims priority to U.S. Provisional Application Ser. No. 62/257,171, entitled "RECEIVER-SIDE PROCESSING OF ORTHOGONAL TIME FREQUENCY SPACE MODULATED SIGNALS" filed on Mar. 23, 2016. The entire content of the aforementioned patent applications is incorporated by reference herein.

TECHNICAL FIELD

The present document relates to wireless communication, and more particularly, to receiver-side processing of orthogonal time frequency space modulated signals.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses receiver-side techniques for receiving orthogonal time frequency and space (OTFS) modulated signals, and extracting information bits therefrom.

In one example aspect, a wireless communication method, implemented by a wireless communications receiver is disclosed. The method includes processing a wireless signal comprising information bits modulated using an orthogonal time frequency and space (OTFS) modulation scheme to generate time-frequency domain digital samples, performing linear equalization of the time-frequency domain digital samples resulting in an equalized signal, inputting the equalized signal to a feedback filter operated in a delay-time domain to produce a decision feedback equalizer (DFE) output signal, extracting symbol estimates from the DFE output signal, and recovering the information bits from the symbol estimates.

In another example aspect, an apparatus for wireless communication is disclosed. The apparatus includes a module for processing a wireless signal received at one or more antennas of the apparatus. A module may perform linear equalization in the time-frequency domain. A module may perform DFE operation in the delay-time domain. A module may perform symbol estimation in the delay-Doppler domain.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

The present-day wireless technologies are expected to fall short in meeting the rising demand in wireless communications. Many industry organizations have started the efforts to standardize next generation of wireless signal interoperability standards. The 5th Generation (5G) effort by the 3rd Generation Partnership Project (3GPP) is one such example and is used throughout the document for the sake of explanation. The disclosed technique could be, however, used in other wireless networks and systems.

Section headings are used in the present document to improve readability of the description and do not in any way limit the discussion to the respective sections only.

Figure 1:
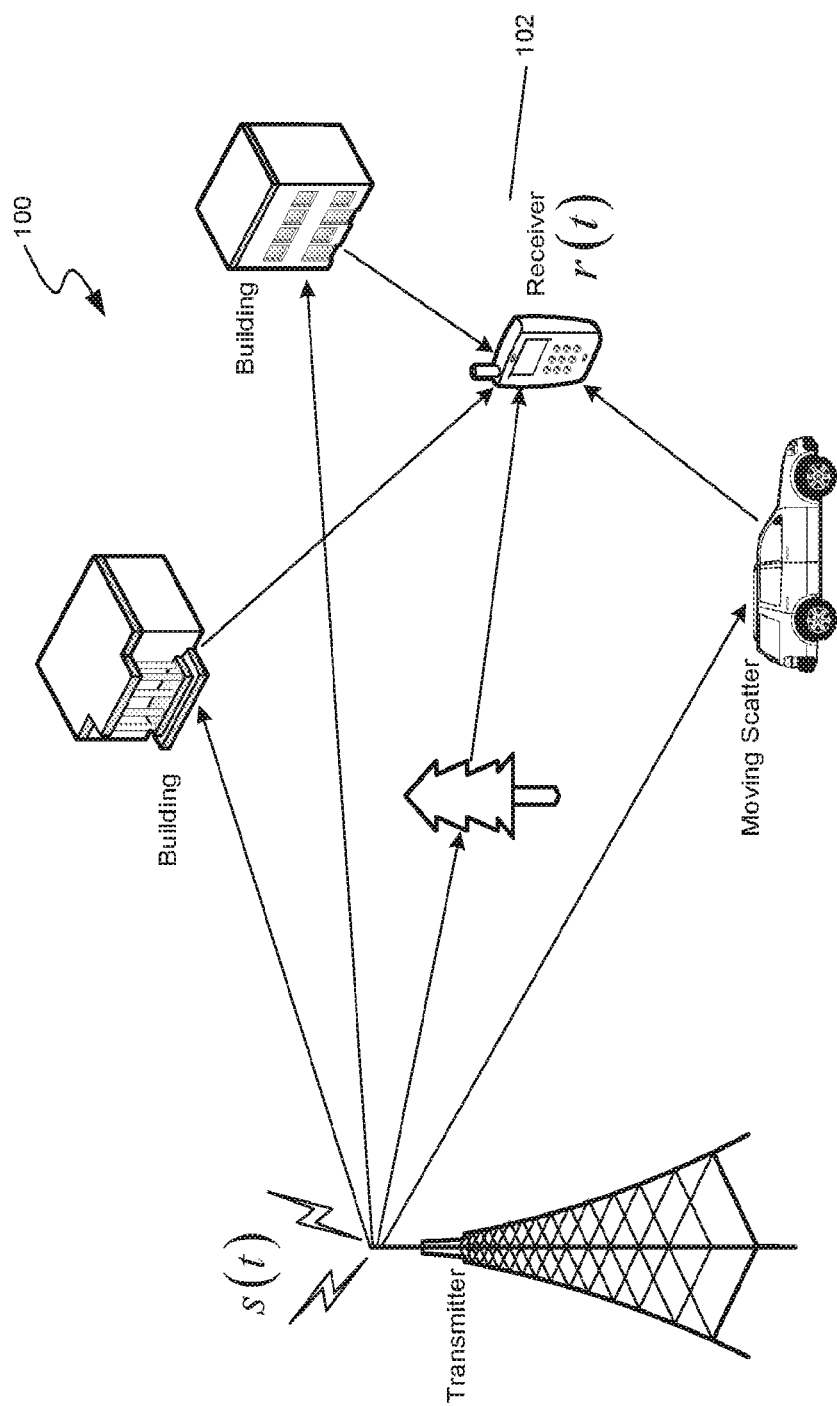
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

Because OTFS modulated signals are not modulated along a time-frequency grid but along a delay-Doppler grid, traditional signal reception techniques such as those used for receiving orthogonal frequency division multiplexing (OFDM) signals, for example, as used in Long Term Evolution (LTE) systems, cannot provide adequate performance to receive and process OTFS signals to extract or recover information bits modulated on the OTFS signals.

The presently disclosed techniques can overcome these problems, and others.

1. Introduction

Signal transmission over a wireless fading channel undergoes time and frequency selective fading which must be compensated for reliable end-to-end communication. Contemporary multi-carrier modulation techniques such as Orthogonal Frequency Division Multiplexing (OFDM) and Single Carrier Frequency Division Multiplexing (SC-FDM) exploit the degrees of freedom offered by the channel's frequency selectivity, which is characterized by the delay spread. However, the time-selective nature of the channel, as characterized by the Doppler spread, is not natively handled by these modulation techniques. Orthogonal Time Frequency and Space is a generalized two-dimensional multi-carrier modulation that fully exploits the degrees of freedom offered by the delay and Doppler dimensions of a wireless channel.

1.1 Notation

The following mathematical notation is adopted in this patent document.

Boldface font are used to describe vectors and matrices. In most cases lower-case and upper-case letters denote vectors and matrices respectively. In some cases, such as for differentiating time and frequency vectors, upper-case letters may also be used for vectors in the frequency domain.

The superscripts $(.)^T$, $(.)^*$, $(.)^H$ denote, respectively, transpose, conjugate and conjugate transpose operators while $\otimes$ denotes the Kronecker product.

The element in row i and column j of matrix A is denoted as $A_{ij}$ or $A(i,j)$.

The matrix $F_N$ denotes a normalized N×N DFT matrix where $F_N(i,j)=(1/\sqrt{N})e^{-j2\pi ij/N}$.

$I_L$ denotes an L×L identity matrix, while $O_{L\times L}$ denotes an L×L zero matrix.

$\mathbb{C}^M$ denotes the M-dimensional vector space over the field of complex numbers, and $x \in \mathbb{C}^M$ represents an M-dimensional column vector.

$N_t, N_r$ are, respectively, the number of transmit and receive antennas.

$N_l$ is the number of spatial layers or streams.

N,M are the dimensions of the lattice corresponding to the Delay and Doppler axes respectively.

X(k,l) represents a signal at the (k,l) point on the time-frequency grid, where k is the frequency index and l is the time index.

2. Signal Model

Figure 2:
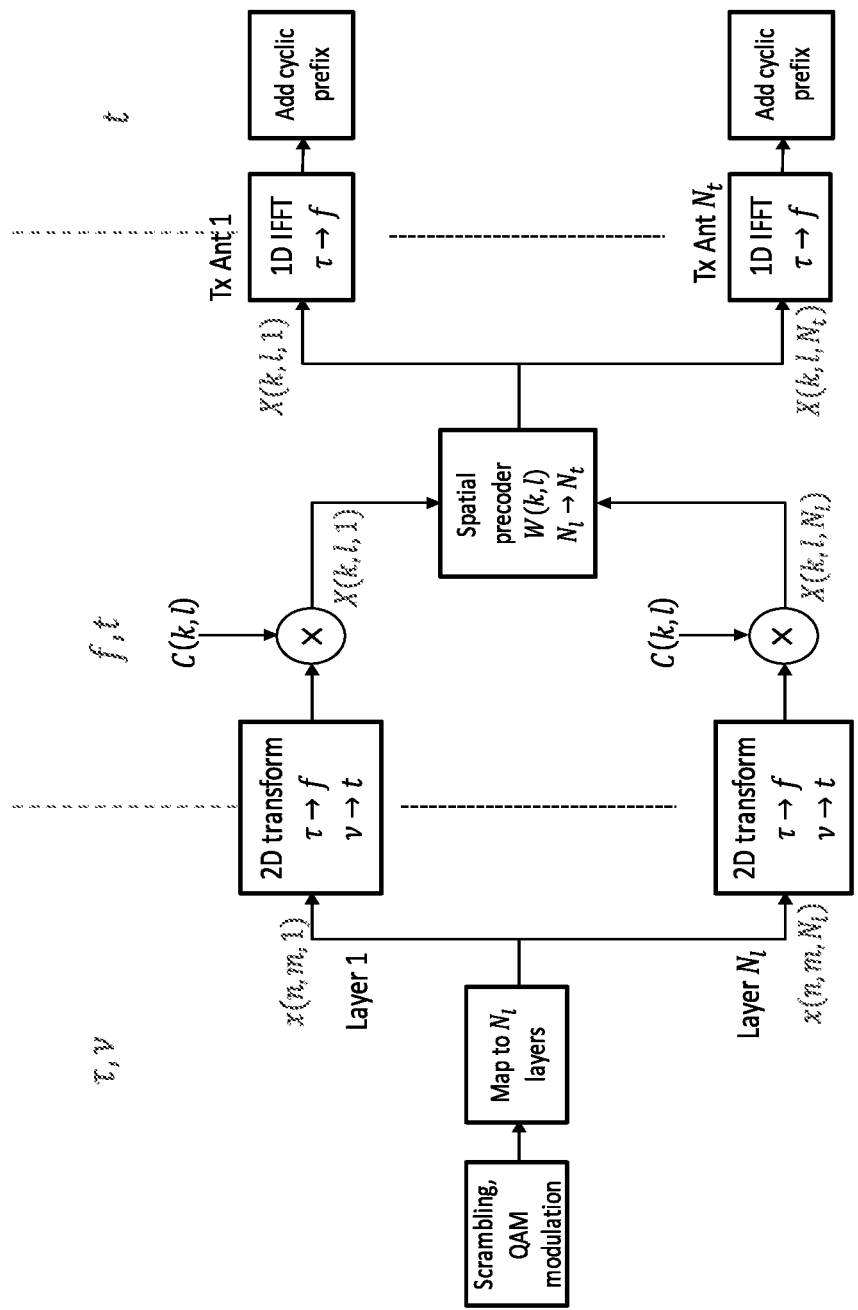
FIG. 2 is a block diagram showing an example of an OTFS transmitter.

A multi-antenna communication system may include devices transmitting over a wireless fading channel with $N_t$ transmit antennas and $N_r$ receive antennas. FIG. 2 depicts an example of an OTFS transmitter. The information bits to be communicated from the transmitter may be encoded by a Forward Error Correction (FEC) block, rate matched to the number of bits the channel allocation can support, scrambled and modulated onto a discrete constellation denoted as $\Omega$. The information bits may include user data that is locally generated or received from other equipment via a data input connection (not shown in the figure). For clarity, a Quadrature Amplitude Modulation (QAM) constellation example is discussed, but it is also possible to use some other digital constellation such as Phase Shift Keying.

The QAM symbols are mapped onto one or more spatial layers (or streams) according to the determined channel rank. For example, in downlink cellular transmission from a base station to a User Equipment (UE), the channel rank may be computed by the UE and fed back as channel state information (CSI) to the base station. Alternatively, in a Time Division Duplex (TDD) system, the base station derives the channel rank by exploiting uplink-downlink channel reciprocity.

For OTFS transmission, the information symbols for layer p can be viewed as functions defined on a two-dimensional Delay-Doppler plane, $x(\tau,v,p)$, p=0, ..., $N_l-1$. The two-dimensional Delay-Doppler channel model equation is characterized by a 2D cyclic convolution $$y(\tau, v) = h(\tau, v) \underset{2D}{*} x(\tau, v) \quad (1)$$

where the MIMO channel $h(\tau,v)$ is of dimension $N_r \times N_l$ and has finite support along the Delay and Doppler axes, and $y(\tau,v) \in \mathbb{C}^{N_r}$ is the received noiseless signal. The transmitted vector $x(\tau,v) \in \mathbb{C}^{N_l}$ is assumed to be zero mean and unity variance. Practically, the QAM symbols are mapped onto a lattice by sampling at N points on the $\tau$ axis and M points on the v axis, i.e. x(n,m,p), where n=0, ..., N-1 and m=0, ..., M-1. For simplicity we will omit the layer indexing except where necessary.

For each spatial layer, the information symbol matrix is transformed to the time-frequency domain by a two-dimensional transform. One such transform is the inverse Discrete Symplectic Fourier transform (IDSFT). The convention adopted in the present document about Symplectic Fourier transforms follows the 1-dimensional analogue. (1) (Continuous-time) Fourier transform (FT)<->Symplectic Fourier transform (SFT). (2) Discrete-time Fourier transform (DTFT)<->Discrete time-frequency Symplectic Fourier transform (DTFSFT). (3) Discrete Fourier transformqj (DFT)<->Discrete Symplectic Fourier transform (DSFT). The IDSFT converts the effect of the channel on the transmitted signal from a two-dimensional cyclic convolution in the Delay-Doppler domain to a multiplicative operation in the time-frequency domain. The IDSFT operation is given by the expression:

$$X(k, l) = IDSFT\{x(n, m)\} \quad (2)$$
$$= \sum_{n=0}^{N-1} \sum_{m=0}^{M-1} x(n, m) b_{n,m}^*(k, l)$$
$$b_{n,m}(k, l) = 1/\sqrt{MN} e^{j2\pi\left(\frac{kn}{N} - \frac{lm}{M}\right)},$$
$$k = 0, \ldots, N-1, l = 0, \ldots, M-1.$$

It can be seen from the above that the IDSFT operation produces a 2D signal that is periodic in N and M.

Next, a windowing function, C(k,l), may be applied over the time-frequency grid. This windowing function serves multiple purposes. A first purpose is to randomize the time-frequency symbols. A second purpose is to apply a pseudo-random signature that distinguishes OTFS transmissions in a multiple access system. For example, C(k,l) may represent a signature sequence with low cross-correlation property to facilitate detection in a multi-point-to-point system such as the downlink of a wireless cellular network.

The spatial layers for each time-frequency grid point may be re-arranged into a vector at the input of the spatial precoder. The input to the spatial precoder for the (k,l) grid point is $X_{k,l}=[X_{k,l}(0), \ldots, X_{k,l}(N_l-1)]^T$. The spatial precoder $W(k,l) \in \mathbb{C}^{N_t \times N_l}$ transforms the $N_l$ layers to $N_t$ streams matching the number of transmit antennas. Subsequently, multi-carrier post-processing is applied, yielding the transmit waveform in the time domain. FIG. 2 shows an exemplary scheme, wherein a 1D IFFT is sequentially applied across the M OTFS time symbols. A cyclic prefix is added before the baseband signal is sent to a digital-to-analog converter and up-converted for transmission at the carrier frequency. In a different method a filter-bank may be applied rather than the IFFT+cyclic prefix method shown in FIG. 2.

Figure 3:
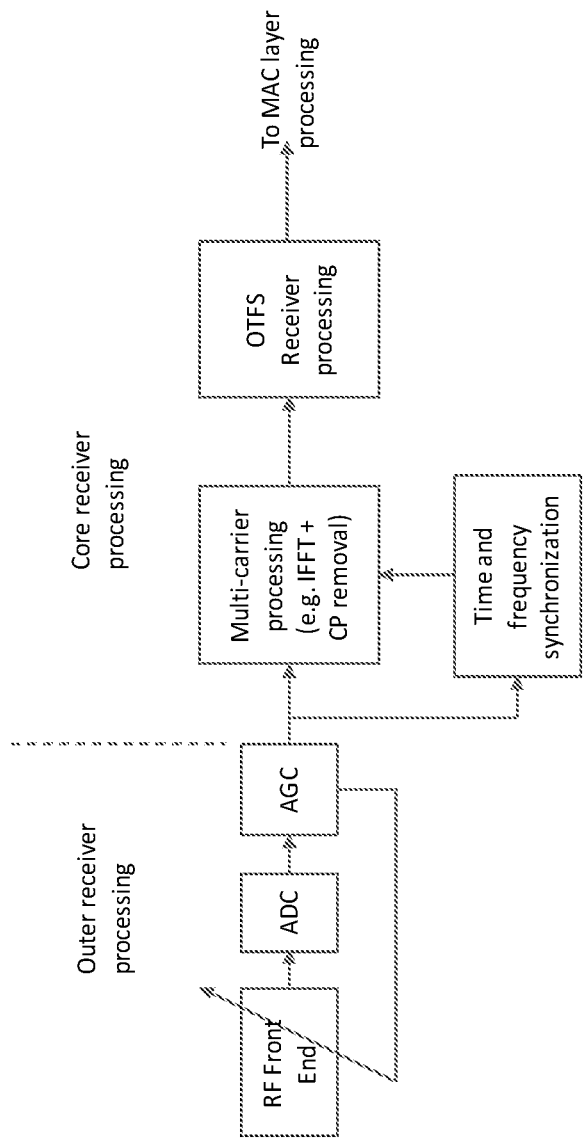
FIG. 3 is a block diagram showing an example of an OTFS receiver.

FIG. 3 depicts an example of an OTFS receiver. From left to the right of the figure, he incoming RF signal is processed through an RF front end, which may include, but is not limited to, down-conversion to baseband frequency and other required processing such as low pass filtering, automatic frequency correction, IQ imbalance correction, and so on. The automatic gain control (AGC) loop and analog-to-digital conversion (ADC) blocks further process the baseband signal for input to the inner receiver sub-system. The time-and frequency synchronization system corrects for differences in timing between the transmitter and receiver sub-systems before multi-carrier processing. Herein, the multi-carrier processing may consist of cyclic prefix removal and FFT processing to convert the receive waveform to the time-frequency domain. In a different method, a filter-bank may be applied for multi-carrier processing.

The received signal at the (k,l) time-frequency grid point is $$Y_{kl} = \tilde{H}_{kl} W(k,l) X_{kl} + Z_{kl} \qquad (3)$$
$$= H_{kl} X_{kl} + Z_{kl}$$

Where $\tilde{H}_{kl} \in \mathbb{C}^{N_r \times N_t}$ is the MIMO channel with each entry modeled as a complex Gaussian random variable $[\tilde{H}_{kl}]_{ij} \sim \mathcal{CN}(0,1)$, and $H_{kl} \in \mathbb{C}^{N_r \times N_l}$ is the equivalent channel after spatial precoding. The thermal noise plus other-cell interference at the receiver input, $Z_{kl} \in \mathbb{C}^{N_r}$ is modeled as a complex Gaussian vector $Z_{kl} \sim \mathcal{CN}(0, R_{ZZ})$. The received signal vector for $N_r$ antennas is given by $$Y_{kl} = [Y_{kl}(0) \ldots, Y_{kl}(N_r-1)]^T$$

3. Linear Equalization

For OFDM systems, the QAM symbols are directly mapped onto the time-frequency grid. Therefore, per-tone frequency domain MMSE equalization is optimal in the mean square error (MSE) sense. In contrast, information symbols in an OTFS system are in the Delay-Doppler domain. Therefore, per-tone frequency MMSE equalization may be sub-optimal. To motivate application of an advanced receiver for OTFS demodulation we will start with the formulation of a linear MMSE equalizer.

For frequency domain linear equalization, the equalized signal at the (k,l) time-frequency index is given by $$\hat{X}_{kl}^{MMSE} = G_{kl} Y_{kl}$$

Applying the Orthogonality theorem the LMMSE filter is $G_{kl} = R_{XY}(k,l) R_{YY}^{-1}(k,l)$, where $$R_{YY}(k,l) = H_{kl} R_{XX}(k,l) H_{kl}^H + R_{ZZ}(k,l)$$

$$R_{XY}(k,l) = R_{XX}(k,l) H_{kl}^H$$

The signal covariance matrix $R_{XX}(k,l) = R_{XX}$ for every k, l, whereas the receiver noise variance matrix $R_{ZZ}(k,l)$ may be different for each time-frequency index. For convenience the time-frequency indices could be dropped except where necessary. Using the matrix inversion lemma, the LMMSE (also known as Wiener) filter can be re-written as $$G = R_{XX}(I + H^H R_{ZZ}^{-1} H R_{XX})^{-1} H^H R_{ZZ}^{-1} \qquad (4)$$

After equalization, a Discrete Symplectic Fourier Transform (DSFT) is performed to convert the equalized symbols from time-frequency to the Delay-Doppler domain.

The QAM symbols could be considered to reside in the Delay-Doppler domain. Thus, time-frequency domain equalization can be shown to be sub-optimal. To see this, consider the residual error after LMMSE filtering, $E_{kl} = \hat{X}_{kl}^{MMSE} - X_{kl}$, where $E_{kl} \in \mathbb{C}^{N_l}$. The corresponding MSE matrix $R_{EE}(k,l) \in \mathbb{C}^{N_l \times N_l}$ is given by $$R_{EE}(k,l) = E\{E_{kl} E_{kl}^H\} \qquad (5)$$
$$= R_{XX}(I + H_{kl}^H R_{ZZ}^{-1}(k,l) H_{kl} R_{XX})^{-1}$$

Since the equalization is performed independently at each time-frequency index, the covariance matrix is independent across the time-frequency grid. For time index l the error covariance matrix is a block diagonal matrix where each entry on the diagonal is an $N_l \times N_l$ matrix, i.e.

$$R_{EE}(l) = \begin{bmatrix} R_{EE}(0,l) & \cdots & 0_{N_l \times N_l} \\ \vdots & \ddots & \vdots \\ 0_{N_l \times N_l} & \cdots & R_{EE}(N-1,l) \end{bmatrix} \qquad (6)$$

After linear equalization the channel model expression becomes $$\hat{X}_l^{MMSE} = X_l + E_l \qquad (7)$$

As the DSFT operation can be decomposed into two one-dimensional DFT transforms, we start by considering a length N IDFT along the frequency axis to the delay domain for OTFS time symbol l. This yields, $$\hat{x}_l^{MMSE} = F_N^H \hat{X}_l^{MMSE} \qquad (8)$$
$$= x_l + e_l, l = 0, \ldots, M-1,$$

Where the equalities that $x_l = F_N X_l$ and $e_l = F_N E_l$ are used. The Delay-domain post-equalization error covariance matrix is $$R_{ee}(l) = E\{e_l e_l^H\} \qquad (9)$$
$$= F_N^H E\{E_l E_l^H\} F_N$$
$$= F_N^H R_{EE}(l) F_N$$

The DFT transformation in (9) makes $R_{ee}(l)$ a circulant matrix because $R_{EE}(l)$ is a diagonal matrix. This also implies that the error covariance matrix is no longer white after transformation to the Delay-domain, i.e. the residual error is correlated. This correlated noise is caused by ISI which can be seen by re-writing (8) as $$x_l = \hat{x}_l^{MMSE} - e_l \quad (10)$$
$$= F_N^H G_l Y_l - e_l$$
$$= A_l y_l - e_l$$

where $A_l = F_N^H G_l F_N$ is a circulant matrix. A circulant matrix is characterized by its generator vector, wherein each column of the matrix is a cyclic shift of the generator vector. Let $A_l = [a_{0,l}, \ldots, a_{N-1,l}]^T$ and, without loss of generality, let $a_{0,l}$ be the generator vector. Then it is straightforward to show that the signal model above describes a cyclic convolution:

$$x_l(n) = \Sigma_{m=0}^{N-1} a_{0,l}(m) y_l(n-m)_{mod\,N} \quad (10A)$$

Therefore, ISI is introduced when trying to recover $x_1$ from its estimate. This same reasoning can be extended from the Delay-time domain to the Delay-Doppler domain by computing the second part of the DSFT, namely, a DFT transformation from the time to Doppler domain. This, in effect is a 2D cyclic convolution that reveals a residual 2D inter-symbol interference across both Delay and Doppler dimensions. In the next section we show how a Decision Feedback Equalizer can be used to suppress this residual ISI.

4. Decision Feedback Equalization

As the OTFS information symbols reside in the Delay-Doppler domain, where the channel effect on the transmitted signal is a 2D cyclic convolution, a 2D equalizer is desirable at the receiver. One method of implementing a 2D equalizer is as follows. In a first step, a linear equalizer is applied in the time-frequency domain—as described in the previous section. As a second step, a feedback filter is applied in the Delay-Doppler domain to mitigate the residual interference across both delay and Doppler axes. However, since the OTFS block transmission is cyclic, the residual ISI on a particular QAM symbol is caused by other QAM symbols across the Delay-Doppler plane in the current N×M transmission block. It may be difficult from an implementation perspective to mitigate ISI in a full 2D scheme. The complexity of a 2D feedback filter for a DFE can be reduced by employing a hybrid DFE. Specifically, (1) The feedforward filter is implemented in the time-frequency domain, (2) the feedback filter is implemented in the Delay-time domain, and (3) the estimated symbols are obtained in the Delay-Doppler domain.

The rationale for this approach is that after the feedforward filtering, the residual ISI in the Delay domain dominates the interference in the Doppler domain. A set of M parallel feedback filters are implemented corresponding to the M time indices in the OTFS block. This document discloses a DFE receiver for a single input multiple output (SIMO) antenna system (which includes the case of a single receive antenna) system and then extends to the more general multiple input multiple output (MIMO) case, where multiple data streams are transmitted.

4.1 SIMO-DFE

The input to the feedback filter is given by (8) where for the SIMO case $x_l \in \mathbb{C}^N$. A set of M parallel noise-predictive DFE feedback filters are employed in the Delay-time domain. For time index l, the estimation of $x_l(n)$, $n=0, \ldots, N-1$, is based on exploiting the correlation in the residual error. Given the (LMMSE) feedforward output signal $$x_l^{MMSE}(n) = x_l(n) + e_l(n) \quad (10C)$$

Some embodiments may be implemented to seek a predicted error signal $\hat{e}_l(n)$ such that the variance of the error term, $x_l^{MMSE}(n) - \hat{e}_l(n)$ is reduced before estimation. The closer $\hat{e}_l(n)$ is to $e_l(n)$, the more accurate would be the final detection of $x_l(n)$. For simplicity, it may be assumed that the residual error from μ past detected symbols is known. Then the predicted error at the nth symbol is given by:

$$\hat{e}_l(n) = \sum_{m=1}^{\mu} b_m e_l(n-m) \quad (11)$$

Where $\{b_m\}$ are the error prediction filter coefficients. For simplicity, the analysis below drops the time index l. The expression above for symbol n can be put in a block processing form by re-writing the error vector at symbol n as $\hat{e}_n = [\hat{e}_{n-\mu}, \hat{e}_{n-\mu+1}, \ldots, \hat{e}_n]^T$. Thus, it can be seen that:

$$\hat{e}_n = B e_n, \quad (12)$$

where $B \in \mathbb{C}^{(\mu+1) \times (\mu+1)}$ is a strictly lower triangular matrix (i.e. zero entries on the diagonal) with the last row given by $b_\mu = [b_{\mu,1}, \ldots, b_{\mu,\mu}, 0]$ and $e_n = [e_{n-\mu}, \ldots, e_{n-1}, e_n]^T$.

This predictive error formulation depends on the filter length μ+1. As such, in some implementations, the pre-feedback error covariance matrix $R_{ee}$ may be truncated based on this feedback filter length. Taking into account the cyclic (or periodic) nature of (10) the truncated error covariance matrix for symbol n is given by the sub-matrix:

$$\tilde{R}_{ee} = trunc\{R_{ee}\} \quad (13)$$
$$= R_{ee}[(n-\mu, \ldots, n)_{mod\,N}, (n-\mu, \ldots, n)_{mod\,N}]$$

The final DFE output is then given by $$\hat{x}^{DFE}(n) = \hat{x}^{MMSE}(n) - b_\mu e_n, n=0, \ldots, N-1 \quad (14)$$

Typically, past residual errors are unknown because the receiver only has access to the output of the feedforward equalizer output $\hat{x}^{MMSE}(n)$, $n=0, \ldots, N-1$. Assuming that past hard decisions $\hat{x}^h(n-\mu), \ldots, \hat{x}^h(n-1)\}$ are correct, some implementations can form an estimate of $\hat{e}(n-i)$ as:

$$\hat{e}(n-i) = \hat{x}^{MMSE}(n-i) - \hat{x}^h(n-i), i=1, \ldots, \mu \quad (15)$$

This document also discloses how reliable past decisions can be obtained. The residual error at the output of the feedback filter is then given by:

$$\varepsilon_n = e_n - \hat{e}_n \quad (16)$$
$$= (I_\mu - B) e_n, n = 0, \ldots, N-1$$

The resulting error covariance matrix is:

$$R_{\varepsilon\varepsilon} = E\{\varepsilon_n \varepsilon_n^H\} \quad (17)$$
$$= (I_\mu - B) \tilde{R}_{ee} (I_\mu - B)^H$$

The Cholesky decomposition of $\tilde{R}_{ee}$ is:

$$\tilde{R}_{ee} = LDU$$

where L is a lower triangular matrix with unity diagonal entries, D is a diagonal matrix with positive entries and $U=L^H$ is an upper triangular matrix. Substituting this decomposition into (17), it is straightforward to show that the post DFE error covariance is minimized if $$L^{-1} = I_\mu - B \quad (18)$$

Where B is a strictly lower triangular matrix $$B = \begin{bmatrix} 0 & 0 & 0 & 0 & 0 & 0 \\ b_{10} & 0 & 0 & 0 & 0 & 0 \\ \vdots & \ddots & \ddots & 0 & 0 & 0 \\ \vdots & \vdots & \ddots & \ddots & 0 & 0 \\ b_{\mu-1,0} & \cdots & \cdots & \cdots & 0 & 0 \\ b_{\mu,0} & b_{\mu,1} & \cdots & \cdots & b_{\mu,\mu-1} & 0 \end{bmatrix}$$

Figure 4:
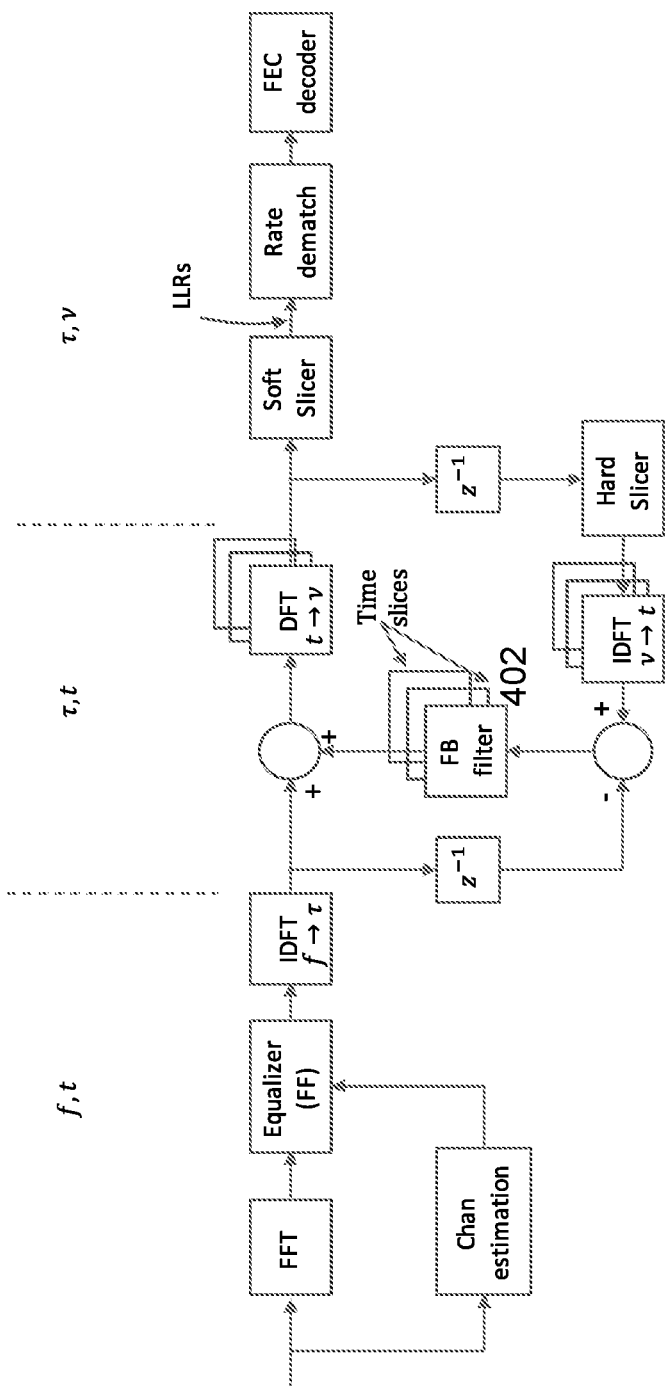
FIG. 4 is a block diagram showing an example of a single input multiple output (SIMO) DFE receiver.

FIG. 4 is a block diagram of an example embodiment of a DFE receiver for a SIMO system. For each time slice $l \in \{0, \ldots, M-1\}$ the feedback section works on each sample $n \in \{0, \ldots, N-1\}$. It can be seen in FIG. 4 that the feedback filter 402 works in parallel across each time slice $l=0, \ldots, M-1$. The Delay-time DFE output is transformed to the Delay-Doppler domain and sent to the soft QAM demodulator (soft slicer), which produces log likelihood ratios (LLRs) as soft input to the FEC decoder.

Figure 5:
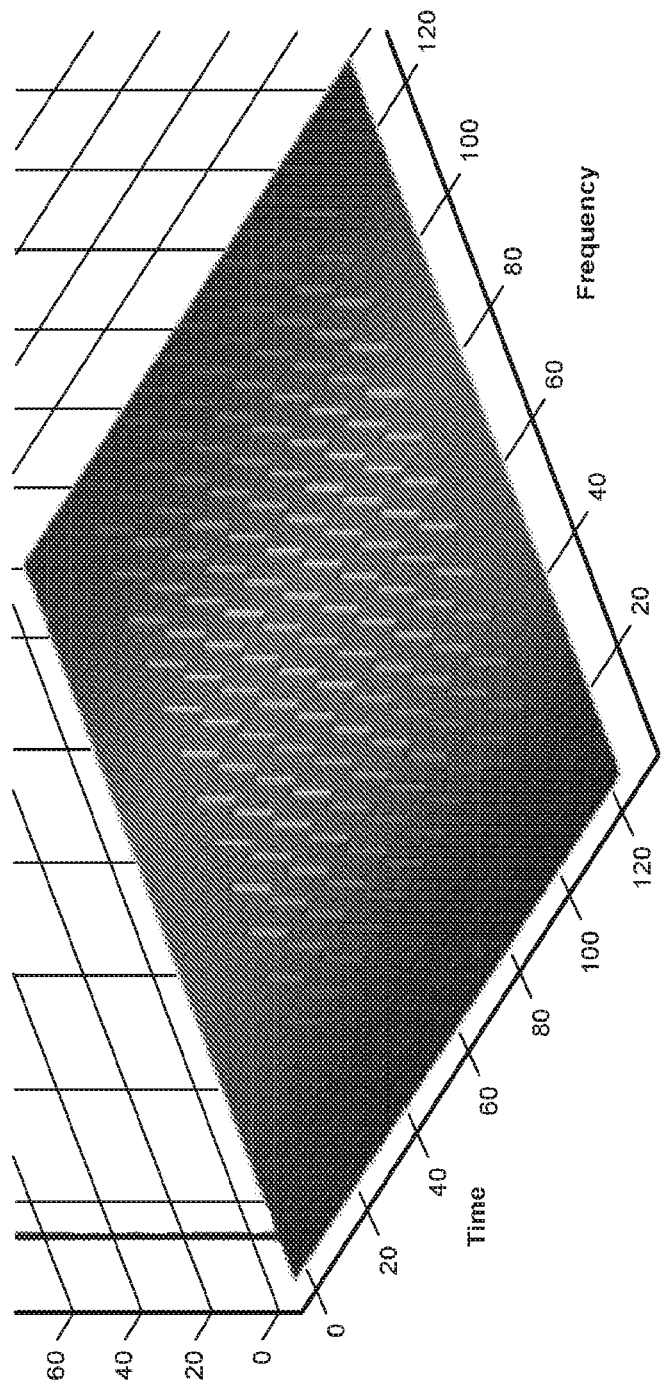
FIG. 5 is a graph showing an example of multiplexing a pilot region and a data region in the delay-Doppler domain.

To start the feedback at $n=0$, the past symbols $\{n-\mu, \ldots, n-1\}$ are actually modulo N, i.e. they are the last portion of the length N data block, for which hard decisions are not yet available. In some embodiments, a hard decision is made on the output of the feedforward filter. Alternatively or additionally, in some embodiments, a known sequence is appended at the end of each transmitted block, which also helps mitigate error propagation. For example, data and pilot regions may be multiplexed in the Delay-Doppler domain as shown in the example graph in FIG. 5. Here, the pilot region consists of a single impulse at (0, 0) and a zero-power region at the edges of the data region to facilitate estimation of the Delay-Doppler channel response at the receiver. This pilot region constitutes a known sequence that can be used to start the feedback filter.

Figure 12:
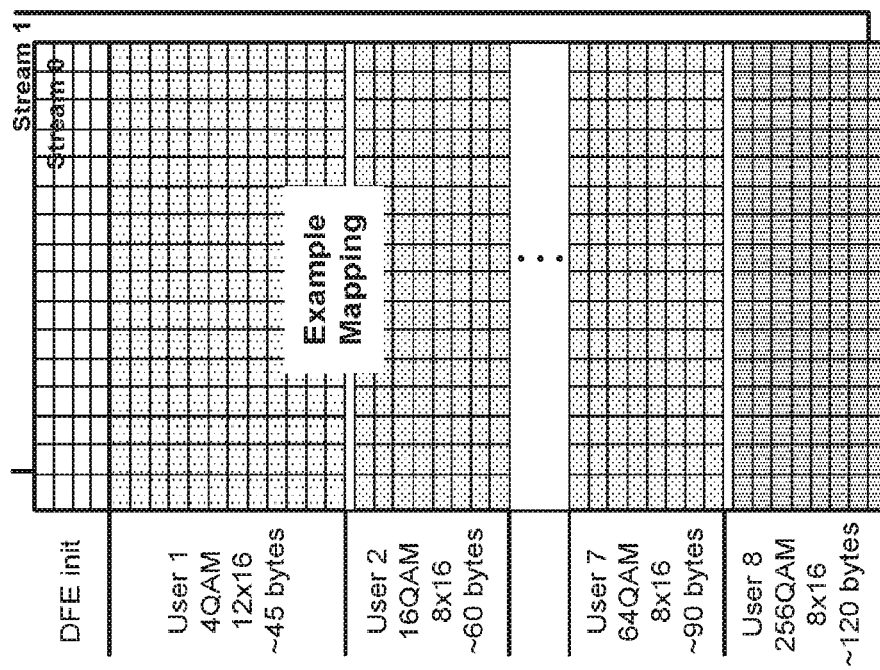
FIG. 12 shows an example of a transmission frame.

In some embodiments, the transmitted signals may include a frame structure in which the lowest constellations are sent at the top (beginning) of a frame, in the delay domain. FIG. 12 show an example of multiplexing information bits for different users in a transmission on a stream-basis such that a pilot signal transmission portion may be at the beginning of the transmission frame, followed by the lowest modulation (4QAM, in this case), followed by increasing modulation for different users based on the channel condition to the corresponding user equipment. The data being sent to different users may thus be arranged along the delay dimension.

As shown the example of FIG. 12, the transmitted wireless signal may include one or more streams (spatial layers). Each stream may include a first portion that includes a decision feedback equalization signal, followed by a second portion in which data being transmitted (e.g., modulation information bits) to multiple user equipment is arranged in increasing level of modulation constellation density along the delay dimension.

In some implementations, the DFE algorithm may be described as follows: (1) Compute the time-frequency LMMSE (feedforward) equalizer output. (2) For the $1^{th}$ OTFS symbol, transform the LMMSE equalizer output to Delay-time domain to obtain (8). (3) Compute the delay-domain error covariance matrix $R_{ee}(l) = F_N^H R_{EE}(l) F_N$. In some implementation, rather than performing the full matrix multiplications, a faster method may be used. (4) Computing the truncated error covariance matrix in (13). (5) Obtaining the filter $b_\mu$ as the last row of $B = I_\mu - L^{-1}$. (6) DFE output for sample n is $$\hat{x}^{DFE}(n) = \hat{x}^{MMSE}(n) - \sum_{i=1}^{\mu} b_{\mu,1}(\hat{x}^{MMSE}(n-i)_{modN} - \hat{x}^h(n-i)_{modN})$$

(6) Collecting all time slices and transform to the Delay-Doppler domain.

4.2 MIMO-DFE

In some embodiments, a MIMO DFE technique could be largely based on the SIMO case but with some differences. First, the expressions in the SIMO case still hold but with the difference that each element of a vector or matrix is now of dimension $N_l$. For instance each element of the $(\mu+1) \times (\mu+1)$ covariance matrix of (13) is an $N_l \times N_l$ matrix. Second, while the cancellation of past symbols eliminates, or at least mitigates, the ISI, there is still correlation between the MIMO streams. It can be shown that, by design, the noise-predictive MIMO DFE structure also performs successive inter-stream interference cancellation (SIC). In the present case, the cancellation between streams may be ordered or un-ordered. This document describes both these cases separately and shows an extension of the DFE receiver to incorporate a near maximum likelihood mechanism.

4.3 MIMO DFE with SIC

Figure 6:
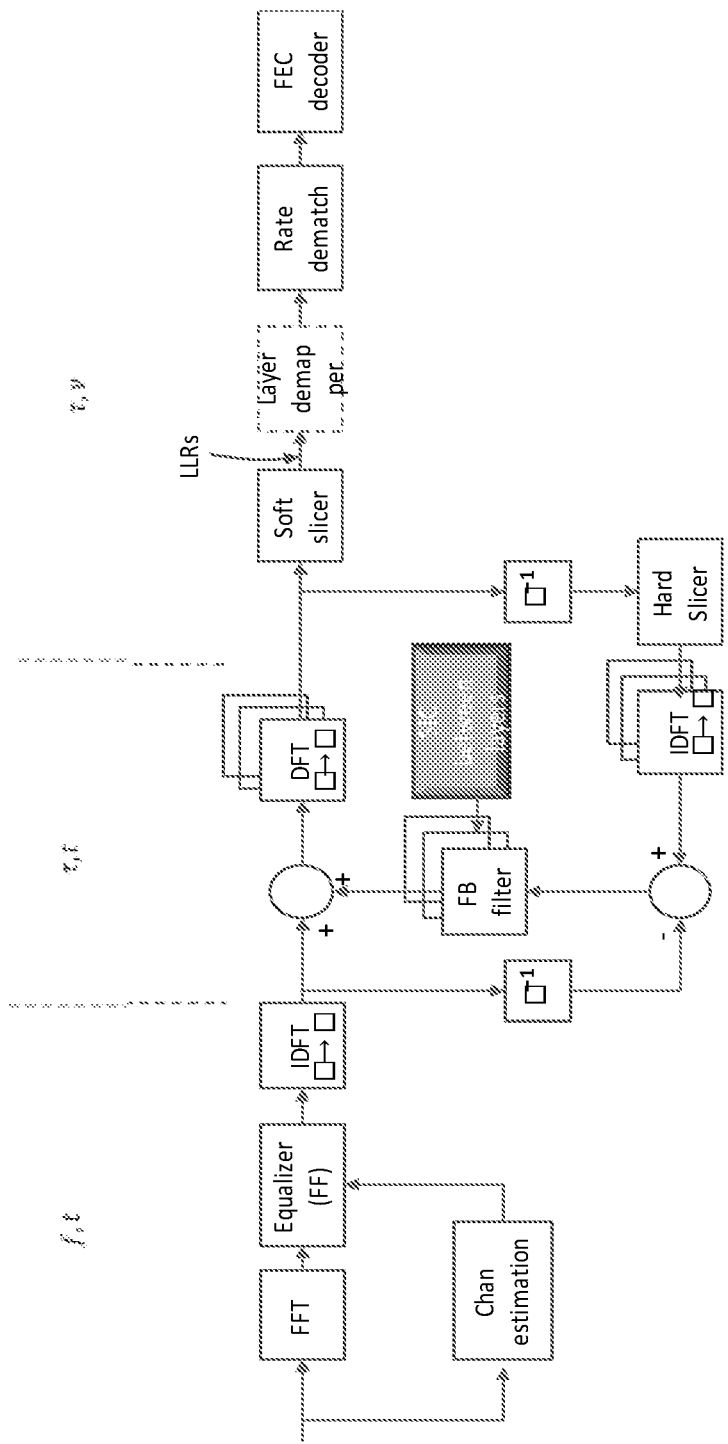
FIG. 6 is a block diagram showing an example of a MIMO DFE with ordered/unordered inter-stream interference cancellation (SIC).

FIG. 6 depicts an example embodiment of a MIMO DFE receiver. The LMMSE feedforward output $\hat{x}^{MMSE}(n)$ is a vector of dimension $N_l > 1$. Similarly to the SIMO ($N_l = 1$) case, the MIMO DFE works in parallel across the time axis. For convenience, the time index $l=0, \ldots, M-1$ are omitted. To detect the data vector at the nth delay index $x_n$ for any time index, arrange the observation vector from the feedforward filter output of (8) first according to spatial layers and then according to the delay domain as:

$$\hat{x}^{MMSE} = \begin{bmatrix} \hat{x}^{MMSE}_{n-\mu,0} \\ \vdots \\ \hat{x}^{MMSE}_{n-\mu,N_l-1} \\ \vdots \\ \vdots \\ \hat{x}^{MMSE}_{n,0} \\ \vdots \\ \hat{x}^{MMSE}_{n,N_l-1} \end{bmatrix} \quad (19)$$

The frequency-domain error covariance matrix of (6) is a block diagonal matrix, where each diagonal element $R_{EE}(n, n) \in \mathbb{C}^{N_l \times N_l}$. Define the block N×N DFT matrix as $$\tilde{F}_N = F_N \otimes I_{N_l} \quad (20)$$

Then, it is straightforward to show that the corresponding delay-domain error covariance is given by:

$$R_{ee} = \tilde{F}_N^H R_{EE} \tilde{F}_N \quad (21)$$

Similar to the SIMO case, the columns of $R_{ee}$ an be obtained by an $N_l \times N_l$ block circular shift of the generator vector $R_{ee}[0] \in \mathbb{C}^{N \cdot N_l \times N_l}$.

Again, implementations can obtain the truncated covariance matrix of (13), and after Cholesky decomposition, the lower triangular matrix is of the form:

$$L = \begin{bmatrix} L_{0,0} & 0 & 0 & 0 & 0 \\ L_{1,0} & L_{1,1} & 0 & 0 & 0 \\ \vdots & \vdots & \ddots & 0 & 0 \\ \vdots & \vdots & \ddots & \cdots & 0 \\ L_{\mu-1,0} & \cdots & \cdots & \cdots & 0 \\ L_{\mu,0} & L_{\mu,1} & \cdots & \cdots & L_{\mu,\mu} \end{bmatrix}$$

Each diagonal entry of L is an $N_l \times N_l$ lower triangular matrix. The feedback filter is taken as the last block row of the B matrix obtained as in (18) but now for the MIMO case. Hence, the matrix feedback filter $b_\mu \in \mathbb{C}^{N_l \times N_l(\mu+1)}$ is given by:

$$b_\mu = [b_{\mu,0}, b_{\mu,1}, \ldots, b_{\mu,\mu}] \quad (22)$$

The last block element $b_{\mu,\mu}$ is strictly lower triangular. To see the effect of the inter-stream cancellation, consider the 2×2 case. The last block element of the feedback filter is given by $$b_{\mu,\mu} = \begin{bmatrix} 0 & 0 \\ \alpha & 0 \end{bmatrix} \quad (23)$$

From (19) the current symbol vector to be detected is $x_n = [x_{n,0}\ x_{n,1}]^T$. From the product $b_{\mu,\mu} \cdot e_n$ which is performed in (14) it can be seen that for the feedback filter does not act on the error in the first layer, while for the second layer, there is a filter coefficient acting on the first layer.

The interpretation may be as follows: for the first layer a prediction error is computed only from hard decisions of past symbol vectors. For the second layer, the detection of the first layer is used to predict error for detecting the second layer. More generally, detection of a spatial layer for a current symbol vector utilizes hard decisions from past detected symbol vectors as well as hard decisions for preceding layers in the current symbol. This is equivalently an SIC mechanism without any ordering applied to the stream cancellation. A different method is to apply ordering across the spatial layers in the MIMO system in scenarios where the SINR statistics are not identical across spatial layers.

4.4 MIMO DFE with Maximum Likelihood Detection

A different method to the DFE is to only cancel the ISI from past symbol vectors. That is, to detect $x_n$, implementations can use an observation vector of $v_{n,past} = [v_{n-\mu}^T, v_{n-\mu-1}^T, \ldots, v_{n-1}^T]^T$ to form the prediction error vector for (14). If the cancellation of ISI is perfect, the post DFE signal expression for the $n^{th}$ symbol vector $$\hat{x}_n^{DFE} = x_n + e_n \quad (24)$$

is now similar to what is expected in say OFDM, where the interference is only between the spatial layers (or streams). Therefore, implementations can apply a maximum likelihood receiver to detect the QAM symbols on each layer.

Figure 7:
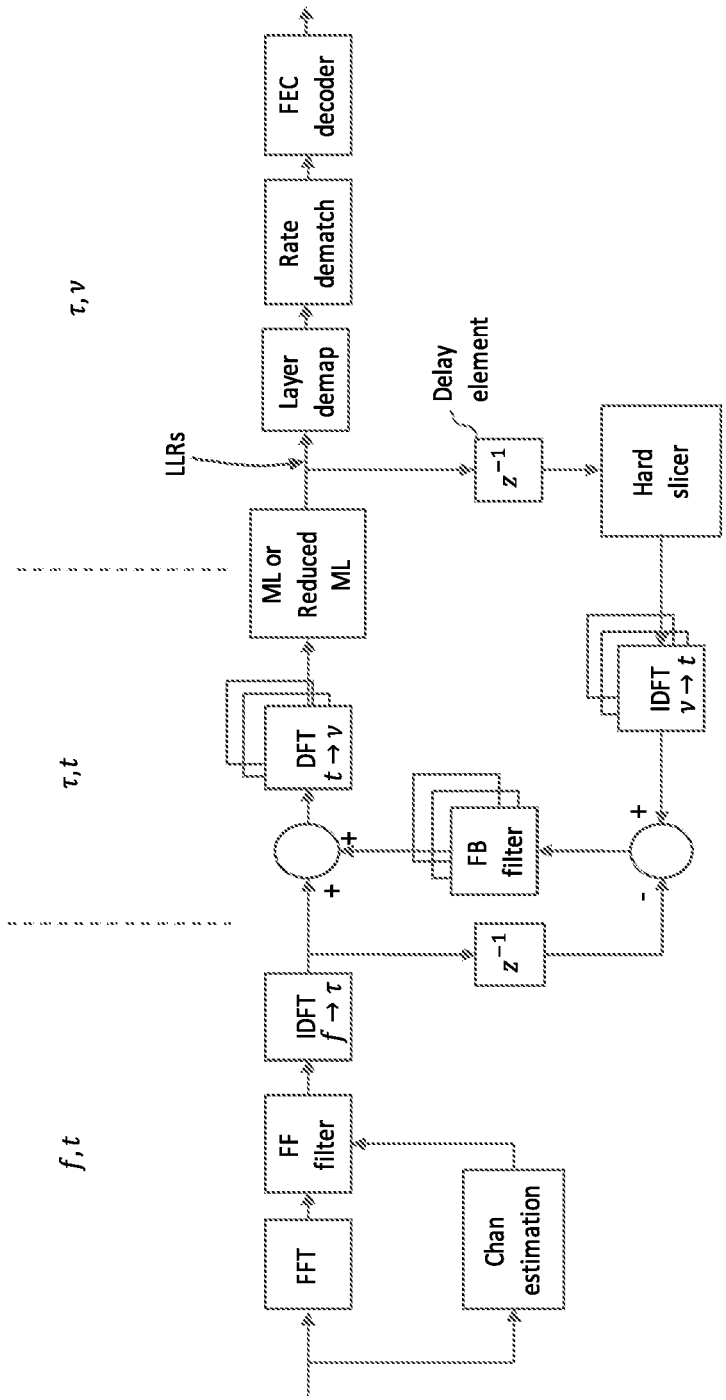
FIG. 7 is a block diagram showing an example of a MIMO maximum likelihood (ML) DFE receiver which uses a hard slicer.

FIG. 7 depicts an example embodiment of a DFE-ML receiver, where a hard slicer is applied for the input to the DFE feedback path. Given a QAM constellation $\Omega$, the ML decision is $$\hat{x}_n^{ML} = \underset{u \in \Omega^{N_l}}{\operatorname{argmax}} (u - \hat{x}_n^{DFE})^H R_{ee}^{-1} (u - \hat{x}_n^{DFE}) \quad (25)$$

The error covariance matrix, $R_{ee}$ corresponds to the additive error in (24) that is obtained after cancelling interference from past symbols. Furthermore, $R_{ee}$ is not white. To improve detection performance, some embodiments may first whiten the ML receiver input as follows. First, decompose the error covariance matrix as $R_{ee} = R_{ee}^{1/2} R_{ee}^{T/2}$. Then, let the input to the ML receiver be $$R_{ee}^{-1/2} \hat{x}_n^{DFE} = R_{ee}^{-1/2}(x_n + e_n) \quad (26)$$

$$= R_{ee}^{-1/2} x_n + \tilde{e}_n$$

This expression now follows the basic MIMO equation for ML, i.e. y=Hx+n, where, in our case, the channel $H = R_{ee}^{-1/2} x_n$ and the noise covariance matrix $E\{\tilde{e}_n \tilde{e}_n^H\} = I_{N_l}$.

In addition, the ML provides a log likelihood ratio (LLR) for each transmitted bit. Rather than resort to hard QAM decisions for the DFE, a different method is to generate soft QAM symbols based on the LLR values from the ML receiver.

Figure 8:
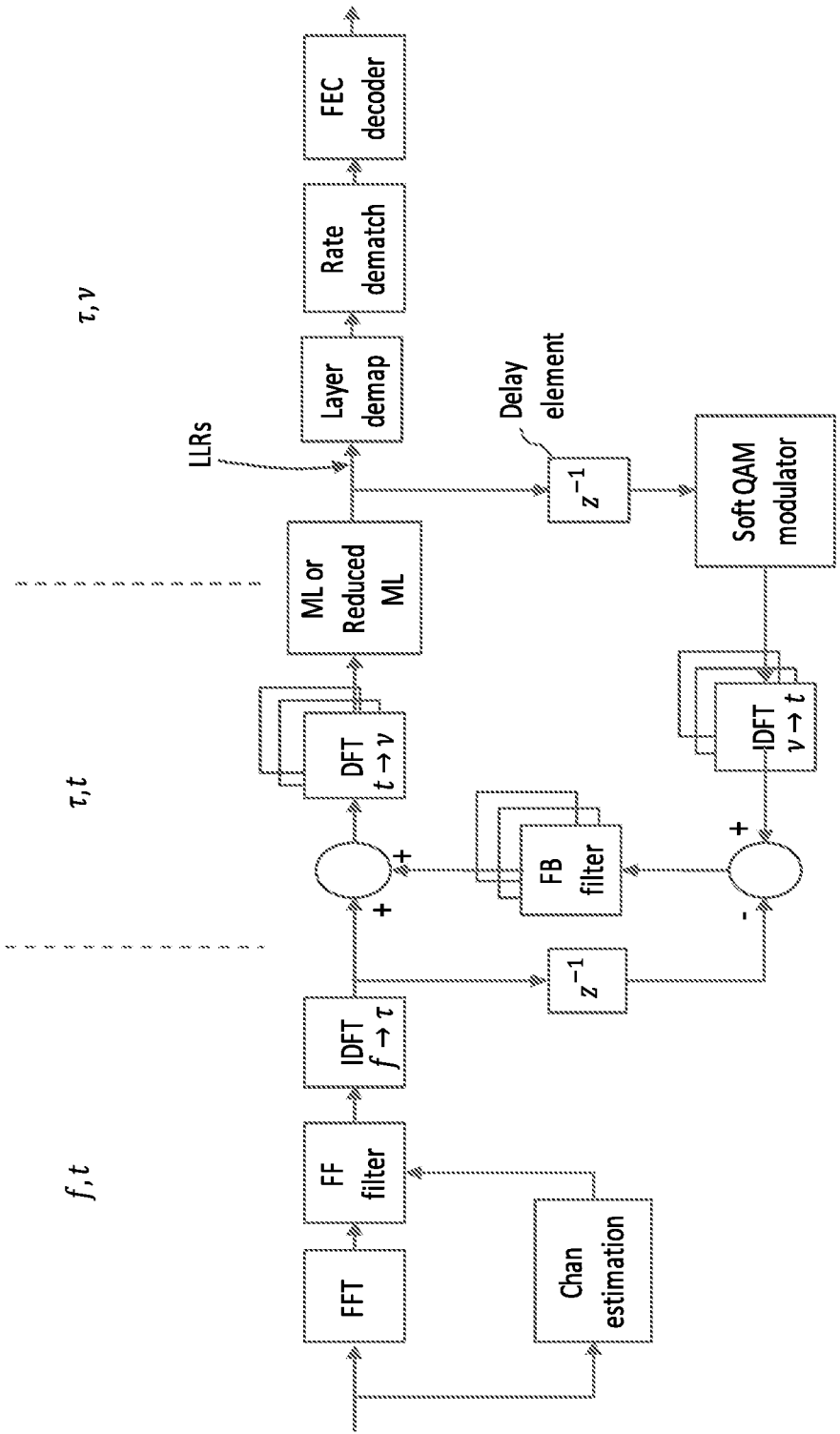
FIG. 8 is a block diagram showing an example of a MIMO ML-DFE receiver that uses soft-QAM modulation.

FIG. 8 illustrates an example embodiment of a DFE-ML receiver with soft input to the feedback path. While all other functional blocks are similar to FIG. 7, in place of a hard slicer, a soft QAM modulator may be used to provide input to the IDFT operation in the feedback path.

Figure 9:
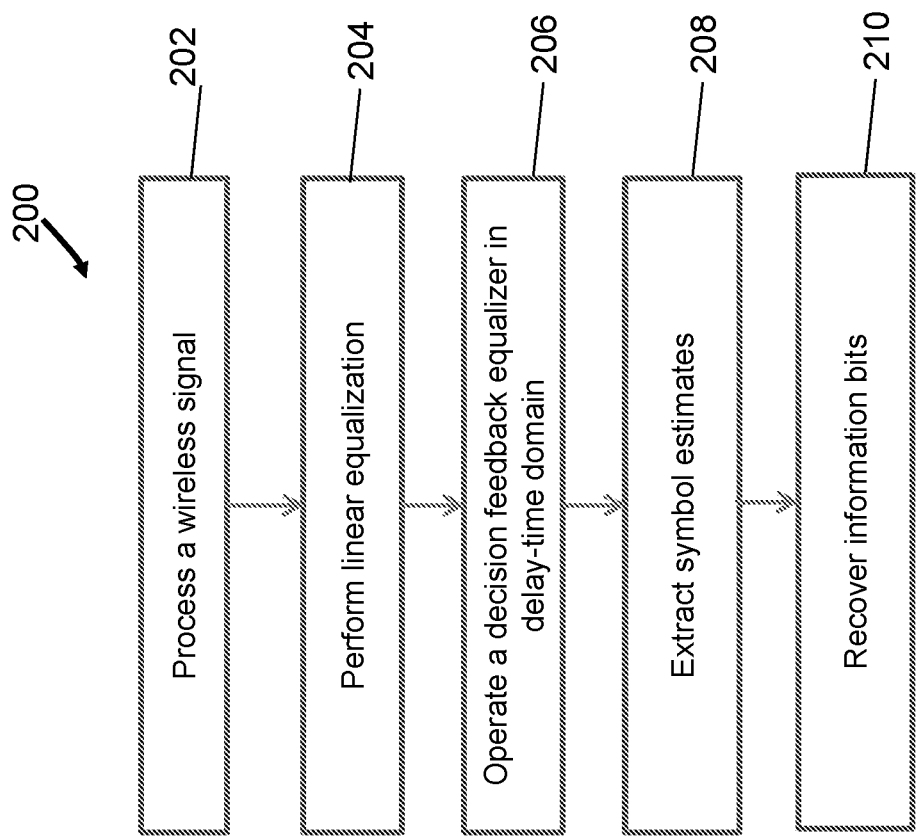
FIG. 9 shows a flowchart of an example wireless communication transmission method.

FIG. 9 is a flowchart for an example method 200 of wireless communication. The method 200 may be implemented by a wireless receiver, e.g., receiver 102 depicted in FIG. 1.

The method 200 includes, at 202, processing a wireless signal comprising information bits modulated using an OTFS modulation scheme to generate time-frequency domain digital samples. In some embodiments, the time-frequency domain samples may be generated by applying a two-dimensional transform to the wireless signal. The two-dimensional transform may be, for example, a discrete Symplectic Fourier transform. In some embodiments, the two-dimensional transform may be applied by windowing over a grid in the time-frequency domain.

In some embodiments, the processing 202 may be performed using an RF front end which may downcovert the received signal from RF to baseband signal. Automatic Gain Control may be used to generate an AGC-corrected baseband signal. This signal may be digitized by an analog to digital converter to generate digital samples.

The method 200 includes, at 204, performing linear equalization of the time-frequency domain digital samples resulting in an equalized signal. Various embodiments of linear equalization are described in this document. In some embodiments, the linear equalization may be performed using a mean square error criterion and minimizing the error. Some examples are given with reference to Eq. (4) to Eq. (9). In some embodiments, a Wiener filtering formulation may be used for the optimization.

The method 200 further includes, at 206, inputting the equalized signal to a feedback filter operated in a delay-time domain to produce a decision feedback equalizer (DFE) output signal. Various possibilities of DFE include single-input, multiple output (SIMO) DFE (Section 4.1), multiple-input multiple-output (MIMO) DFE (Section 4.2), MIMO-DFE with successive interference cancellation (Section 4.3), and MIMO DFE with maximum likelihood estimation (Section 4.4), as described herein.

The method 200 further includes, at 208, extracting symbol estimates from the DFE output signal. As described with reference to FIGS. 2-4 and 6-8, in some embodiments, the extraction operation may be performed in the delay-Doppler domain.

The method 200 further includes, at 210, recovering the information bits from the symbol estimates. The symbols may be, for example, quadrature amplitude modulation symbols such as 4, 8, 16 or higher QAM modulation symbols.

In some embodiments, a wireless signal transmission method may include generating data frames, e.g., as depicted in FIG. 12, and transmitting the generated data frames to multiple UEs over a wireless communication channel. For example, the transmission method may be implemented at a base station in a wireless network.

Figure 10:
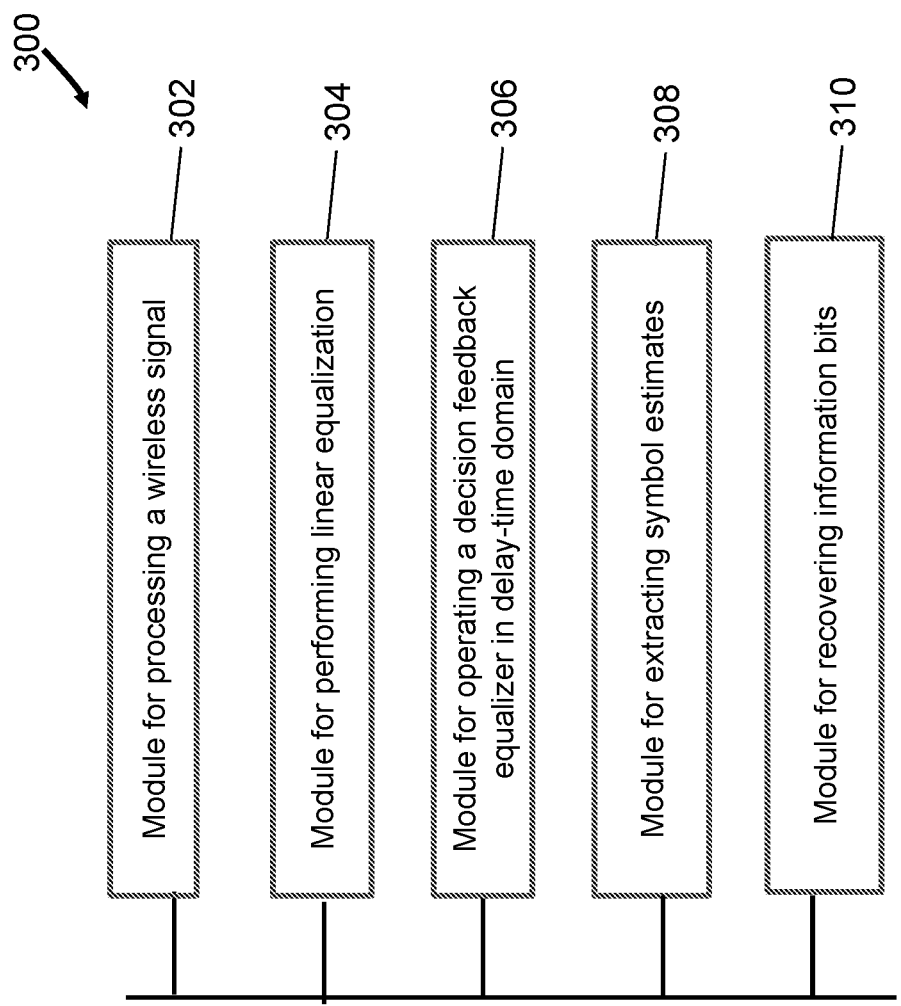
FIG. 10 shows a block diagram of an example of a wireless transmission apparatus.

FIG. 10 is a block diagram showing an example communication apparatus 300 that may implement the method 200. The apparatus 300 includes a module 302 for processing a wireless signal received at one or more antennas of the apparatus 300. A module 304 may perform linear equalization in the time-frequency domain. The module 306 may perform DFE operation in the delay-time domain. The module 308 may perform symbol estimation in the delay-Doppler domain. The module 310 may recover information bits from modulated symbols.

Figure 11:
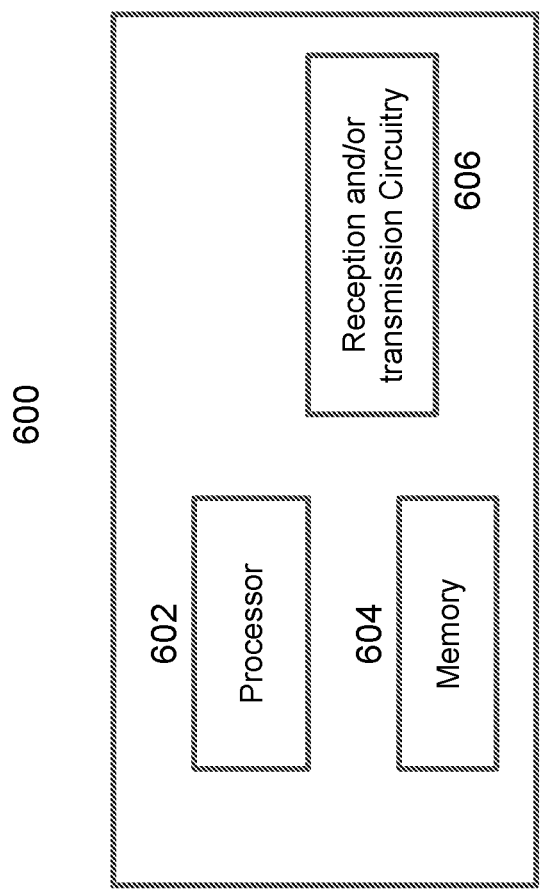
FIG. 11 shows an example of a wireless transceiver apparatus.

FIG. 11 shows an example of a wireless transceiver apparatus 600. The apparatus 600 may be used to implement method 200. The apparatus 600 includes a processor 602, a memory 604 that stores processor-executable instructions and data during computations performed by the processor. The apparatus 600 includes reception and/or transmission circuitry 606, e.g., including radio frequency operations for receiving or transmitting signals.

It will be appreciated that techniques for wireless data reception are disclosed using two-dimensional reference signals based on delay-Doppler domain representation of signals.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, implemented by a wireless communication receiver, comprising:
   processing a wireless signal comprising information bits modulated using an orthogonal time frequency and space (OTFS) modulation scheme to generate time-frequency domain digital samples;
   performing linear equalization of the time-frequency domain digital samples resulting in an equalized signal; and
   inputting the equalized signal to a feedback filter operated in a delay-time domain to produce a decision feedback equalizer (DFE) output signal;
   extracting symbol estimates from the DFE output signal; and
   recovering the information bits from the symbol estimates;
   wherein the processing the wireless signal includes applying a two-dimensional transform to generate the time-frequency domain digital samples;
   wherein the applying the two-dimensional transform comprises a discrete Symplectic Fourier transform or applying a two-dimensional windowing function over a grid in the time-frequency domain.

2. The method of claim 1, wherein the extracting symbol estimates is performed in a delay-Doppler domain.

3. The method of claim 1, wherein the processing the wireless signal includes applying a two-dimensional transform to generate the time-frequency domain digital samples.

4. The method of claim 1, wherein the performing the linear equalization includes performing Wiener filtering of the time-frequency domain digital samples.

5. The method of claim 1, wherein the producing the DFE output signal includes performing a single input multi-output (SIMO) decision feedback equalization (DFE) to produce the DFE output signal.

6. The method of claim 1, wherein the wireless signal comprises one or more streams and wherein each stream comprises a first portion that includes a pilot signal, and a second portion in which data being transmitted to multiple user equipment is arranged in increasing level of modulation constellation density along a delay dimension.

7. The method of claim 1, wherein the DFE is performed by operating a set of M parallel noise-predictive DFE feedback filters in the delay-time domain, where M is an integer.

8. The method of claim 7, further including:
   computing an output of the equalizer by:
   transforming, for a given OTFS symbol, the output of the equalizer to a delay-time domain representation;
   computing an estimate of a delay-domain error covariance matrix;
   computing a truncated error covariance matrix;
   obtaining filter coefficients of a feedforward filter; and
   calculating the output of the equalizer using the filter coefficients.

9. A wireless communication receiver apparatus, comprising:
   a radio frequency (RF) front end;
   a memory storing instructions;
   a processor that reads the instructions from memory to receive a wireless signal from the RF front end and recover information bits from the wireless signal, the instructions comprising:
   instructions for processing a wireless signal comprising information bits modulated using an orthogonal time frequency and space (OTFS) modulation scheme to generate time-frequency domain digital samples;
   instructions for performing linear equalization of the time-frequency domain digital samples resulting in an equalized signal; and
   instructions for inputting the equalized signal to a feedback filter operated in a delay-time domain to produce a decision feedback equalizer (DFE) output signal;
   instructions for extracting symbol estimates from the DFE output signal; and
   instructions for recovering the information bits from the symbol estimates;
   wherein the instructions for processing the wireless signal include instructions for applying a two-dimensional transform to generate the time-frequency domain digital samples;
   wherein the applying the two-dimensional transform comprises applying a discrete Symplectic Fourier transform or applying a two-dimensional windowing function over a grid in the time-frequency domain.

10. The apparatus of claim 9, wherein the instructions for processing the wireless signal include instructions for applying a two-dimensional transform to generate the time-frequency domain digital samples.

11. The apparatus of claim 9, wherein the instructions for extracting symbol estimates include instructions for extracting symbol estimates in a delay-Doppler domain.

12. The apparatus of claim 9, wherein the instructions for performing the linear equalization include instructions for performing Wiener filtering of the time-frequency domain digital samples.

13. The apparatus of claim 9, wherein the instructions for producing the DFE output signal include instructions for performing a single input multi-output (SIMO) decision feedback equalization (DFE) to produce the DFE output signal.

14. The apparatus of claim 13, wherein the SIMO-DFE is performed by operating a set of M parallel noise-predictive DFE feedback filters in the delay-time domain, where M is an integer.

15. The apparatus of claim 14, wherein the instructions further include:
   instructions for computing an output of the equalizer by:
   instructions for transforming, for a given OTFS symbol, the output of the equalizer to a delay-time domain representation;
   instructions for computing an estimate of a delay-domain error covariance matrix;
   instructions for computing a truncated error covariance matrix;
   instructions for obtaining filter coefficients of a feedforward filter; and
   instructions for calculating the output of the equalizer using the filter coefficients.

16. The apparatus of claim 9, wherein the instructions for producing the DFE output signal include instructions for performing a multi-input multi-output (MIMO) decision feedback equalization (DFE) to produce the DFE output signal.

17. A wireless communication receiver apparatus, comprising:
a radio frequency (RF) front end;
a processor configured to cause the wireless communication apparatus to receive a wireless signal from the RF front end and recover information bits from the wireless signal by:
processing the wireless signal comprising information bits modulated using an orthogonal time frequency and space (OTFS) modulation scheme to generate time-frequency domain digital samples;
performing linear equalization of the time-frequency domain digital samples resulting in an equalized signal;
inputting the equalized signal to a feedback filter operated in a delay-time domain to produce a decision feedback equalizer (DFE) output signal;
extracting symbol estimates from the DFE output signal; and
recovering the information bits from the symbol estimates;
wherein the processing the wireless signal include instructions for applying a two-dimensional transform to generate the time-frequency domain digital samples;
wherein the applying the two-dimensional transform comprises applying a discrete Symplectic Fourier transform or applying a two-dimensional windowing function over a grid in the time-frequency domain.

18. The wireless communication receiver apparatus of claim 17, wherein the extracting symbol estimates is performed in a delay-Doppler domain.

19. The wireless communication receiver apparatus of claim 17, wherein the processing the wireless signal includes applying a two-dimensional transform to generate the time-frequency domain digital samples.

20. The wireless communication receiver apparatus of claim 17, wherein the performing the linear equalization includes performing Wiener filtering of the time-frequency domain digital samples.

21. The wireless communication receiver apparatus of claim 17, wherein the producing the DFE output signal includes performing a single input multi-output (SIMO) decision feedback equalization (DFE) to produce the DFE output signal.

22. The wireless communication receiver apparatus of claim 17, wherein the DFE is performed by operating a set of M parallel noise-predictive DFE feedback filters in the delay-time domain, where M is an integer.

23. A wireless communication receiver apparatus, comprising:
a radio frequency (RF) front end;
a memory storing instructions;
a processor that reads the instructions from memory to receive a wireless signal from the RF front end and recover information bits from the wireless signal, the instructions comprising:
instructions for processing a wireless signal comprising information bits modulated using an orthogonal time frequency and space (OTFS) modulation scheme to generate time-frequency domain digital samples;
instructions for performing linear equalization of the time-frequency domain digital samples resulting in an equalized signal; and
instructions for inputting the equalized signal to a feedback filter operated in a delay-time domain to produce a decision feedback equalizer (DFE) output signal;
instructions for extracting symbol estimates from the DFE output signal; and
instructions for recovering the information bits from the symbol estimates;
wherein the instructions for producing the DFE output signal include instructions for performing a single input multi-output (SIMO) decision feedback equalization (DFE) to produce the DFE output signal;
wherein the SIMO-DFE is performed by operating a set of M parallel noise-predictive DFE feedback filters in the delay-time domain, where M is an integer.

24. The wireless communication receiver apparatus of claim 23, wherein the instructions further include:
instructions for computing an output of the equalizer by:
instructions for transforming, for a given OTFS symbol, the output of the equalizer to a delay-time domain representation;
instructions for computing an estimate of a delay-domain error covariance matrix;
instructions for computing a truncated error covariance matrix;
instructions for obtaining filter coefficients of a feedforward filter; and
instructions for calculating the output of the equalizer using the filter coefficients.

25. A wireless communication method, implemented by a wireless communication receiver, comprising:
processing a wireless signal comprising information bits modulated using an orthogonal time frequency and space (OTFS) modulation scheme to generate time-frequency domain digital samples;
performing linear equalization of the time-frequency domain digital samples resulting in an equalized signal; and
inputting the equalized signal to a feedback filter operated in a delay-time domain to produce a decision feedback equalizer (DFE) output signal;
extracting symbol estimates from the DFE output signal; and
recovering the information bits from the symbol estimates;
wherein the DFE is performed by operating a set of M parallel noise-predictive DFE feedback filters in the delay-time domain, where M is an integer.

26. The method of claim 25, further including:
computing an output of the equalizer by:
transforming, for a given OTFS symbol, the output of the equalizer to a delay-time domain representation;
computing an estimate of a delay-domain error covariance matrix;
computing a truncated error covariance matrix;
obtaining filter coefficients of a feedforward filter; and
calculating the output of the equalizer using the filter coefficients.

* * * * *